United States Patent [19]

Hayashi et al.

[11] Patent Number: 5,754,683
[45] Date of Patent: May 19, 1998

[54] IMAGE FORMING APPARATUS AND GRADATION OUTPUT ADJUSTING METHOD IN IMAGE FORMING APPARATUS

[75] Inventors: Syuji Hayashi; Masaya Fujimoto; Katsumi Amakawa; Koji Nakamura; Haruo Yamamoto, all of Osaka, Japan

[73] Assignee: Mita Industrial Co., Ltd., Osaka, Japan

[21] Appl. No.: 343,933

[22] Filed: Nov. 29, 1994

[30] Foreign Application Priority Data

Dec. 10, 1993 [JP] Japan ................. 5-310671

[51] Int. Cl.$^6$ ................. H04N 1/46; G03F 3/08; G06K 9/00
[52] U.S. Cl. ................. 382/167; 358/504; 358/521; 358/518; 382/162
[58] Field of Search ................. 358/521, 518, 358/519, 520, 523, 458, 504, 406; 355/245, 246; 382/162, 165, 167

[56] References Cited

U.S. PATENT DOCUMENTS

| | | | |
|---|---|---|---|
| 4,751,377 | 6/1988 | Ishizaka et al. | 250/205 |
| 4,791,678 | 12/1988 | Iwase | 382/54 |
| 4,959,669 | 9/1990 | Haneda et al. | 346/157 |
| 5,461,462 | 10/1995 | Nakane et al. | 355/208 |

FOREIGN PATENT DOCUMENTS

| | | |
|---|---|---|
| 269033 | 6/1988 | European Pat. Off. . |
| 64-41375 | 2/1989 | Japan . |
| 2207023 | 1/1989 | United Kingdom . |

*Primary Examiner*—Edward L. Coles, Sr.
*Assistant Examiner*—Kimberly A. Williams
*Attorney, Agent, or Firm*—Beveridge, DeGrandi, Weilacher & Young, LLP

[57] ABSTRACT

In a gradation output adjusting method according to the present invention, a gradation correcting section 64 corrects a gradation value of input data in accordance with a predetermined gradation correcting curve and applies the data after the correction to a printer output section 66. In preparing a gradation correcting curve, test data for forming a gradation scale is inputted to the printer output section 66 from a CPU 70. An image corresponding to the test data is read by a scanner section 1. A proper gradation value to be applied to the printer output section 66 is found with respect to some gradation values of the input data on the basis of the result of the reading. A pre-gradation correcting curve is prepared on the basis of the proper gradation value. The pre-gradation correcting curve and a plurality of types of curve patterns previously stored in a ROM 72 are matched. A curve pattern which is best matched to the pre-gradation correcting curve is set as a detailed gradation correcting curve. Since the pre-gradation correcting curve and the curve pattern are matched to set the gradation correcting curve, therefore, the amount of operation may be small and processing time is reduced.

10 Claims, 17 Drawing Sheets

FIG. 3

| TP1 | TP2 | TP3 | TP4 | TP5 | TP6 | TP7 | TP8 |
| --- | --- | --- | --- | --- | --- | --- | --- |
| TP9 | TP10 | TP11 | TP12 | TP13 | TP14 | TP15 | TP16 |
| TP17 | TP18 | TP19 | TP20 | TP21 | TP22 | TP23 | TP24 |
| TP25 | TP26 | TP27 | TP28 | TP29 | TP30 | TP31 | TP32 |
| TP33 | TP34 | TP35 | TP36 | TP37 | TP38 | TP39 | TP40 |
| TP41 | TP42 | TP43 | TP44 | TP45 | TP46 | TP47 | TP48 |
| TP49 | TP50 | TP51 | TP52 | TP53 | TP54 | TP55 | TP56 |
| TP57 | TP58 | TP59 | TP60 | TP61 | TP62 | TP63 | TP64 |

PM — 77

F I G. 7
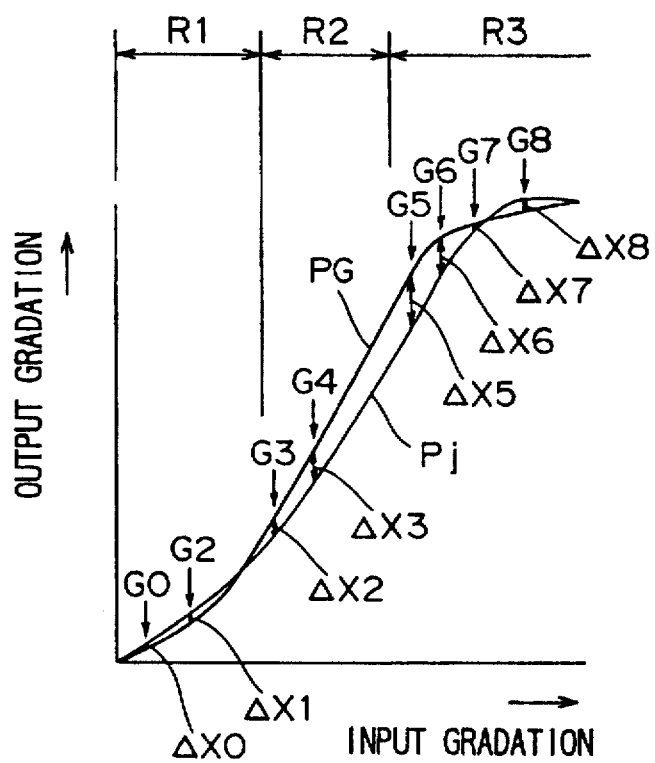

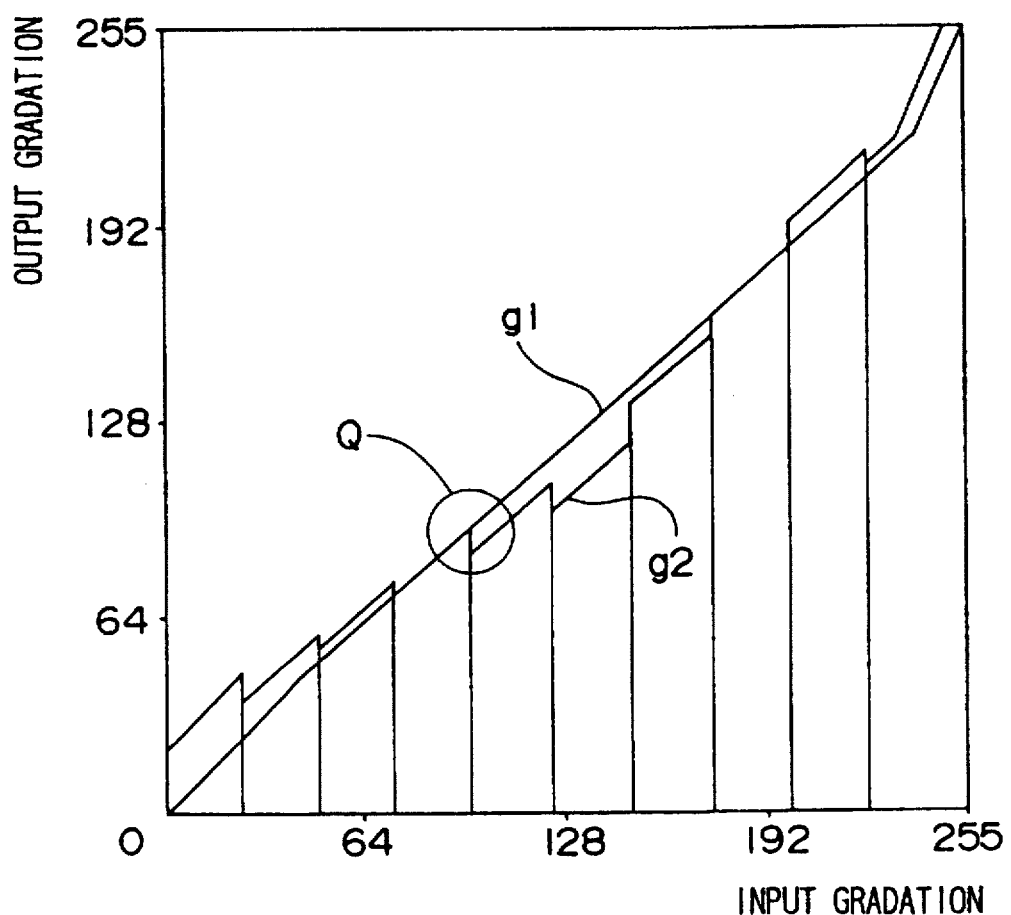
F I G. 11

F I G. 12
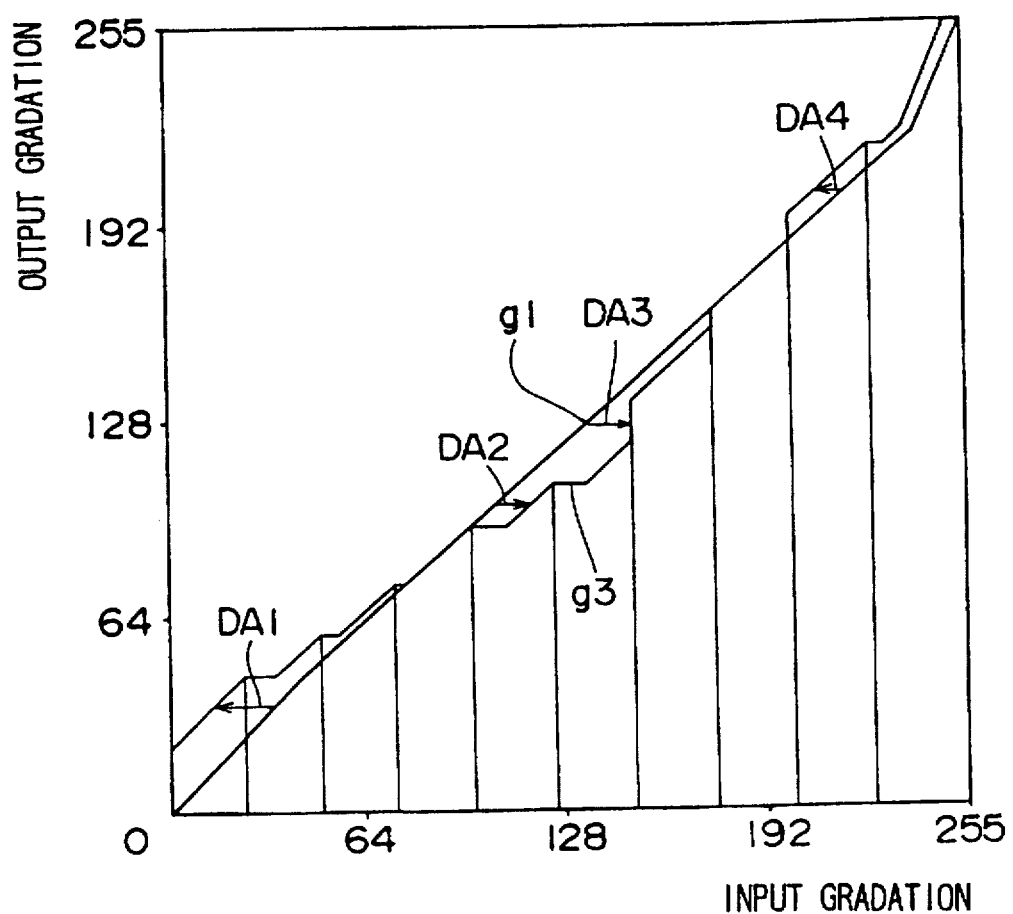

F I G. 13
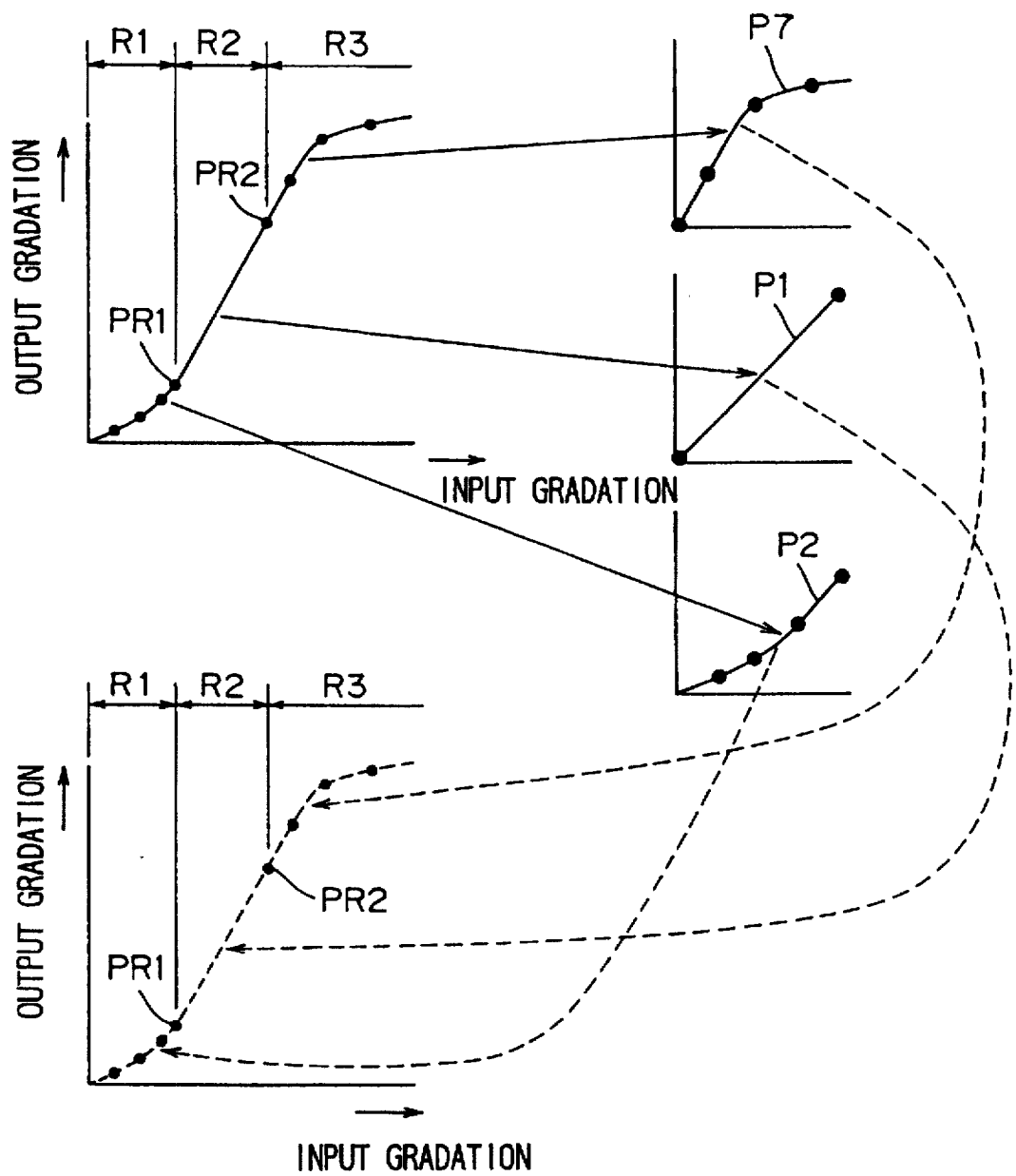

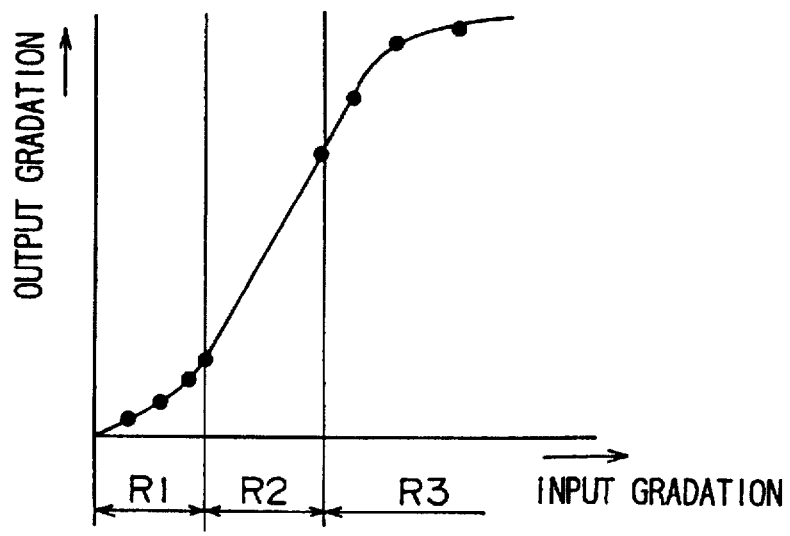
F I G. 14(a)
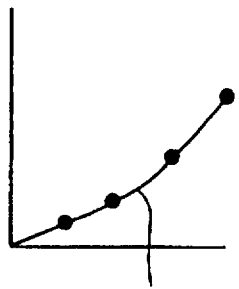
F I G. 14(b)
$Y = aX^2 + bx + c$
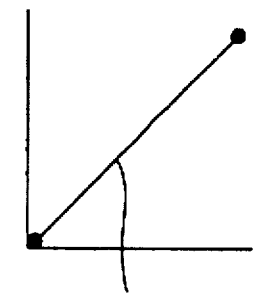
F I G. 14(c)
$Y = dx + e$
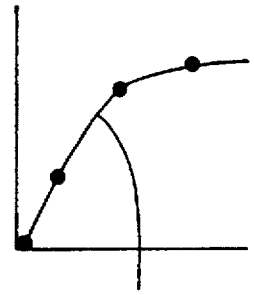
F I G. 14(d)
$Y = fx^2 + gx + h$ F I G. 15
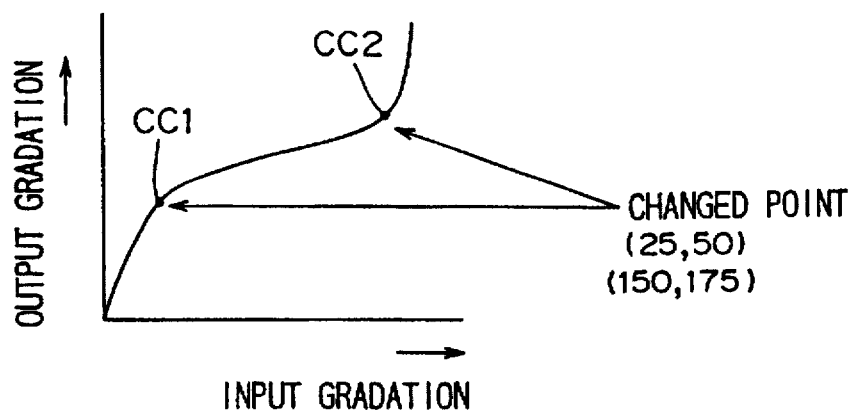
F I G. 16
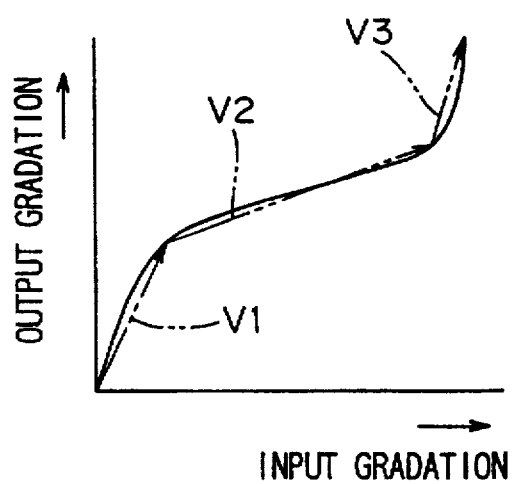

F I G. 17
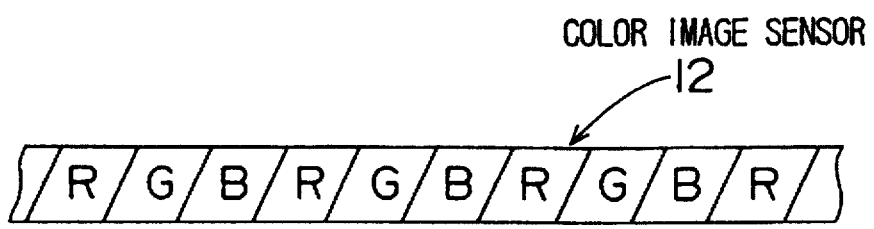
F I G. 18
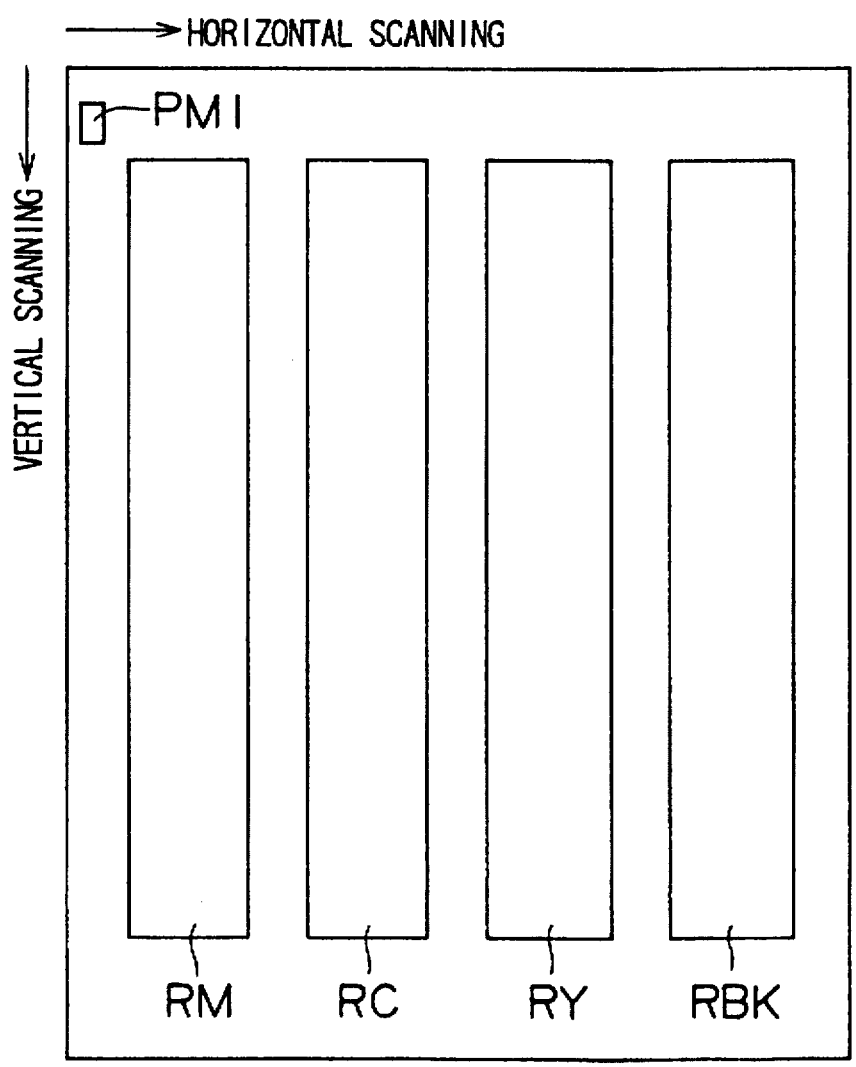

IMAGE FORMING APPARATUS AND GRADATION OUTPUT ADJUSTING METHOD IN IMAGE FORMING APPARATUS

BACKGROUND OF THE INVENTION

1. Field of the Invention

The present invention relates to an image forming apparatus comprising image reading means for reading an image to output data each represented by gradation values and image forming means for forming an image on the basis of the data each represented by gradation values, and a gradation output adjusting method which is applied to the image forming apparatus.

2. Description of the Prior Art

A color copying machine so adapted as to optically read a color document by a CCD (Charge Coupled Device) scanner or the like to convert the color document into signals representing the three primary colors (additive), red (R), green (G) and blue (B) and form a color image on the basis of the signals has been conventionally used. The signals representing the three primary colors R, G and B which are outputted from the scanner are converted into data corresponding to the three primary colors (subtractive), cyan (C), magenta (M) and yellow (Y) which are the additive complementary colors of red, green and blue. Each of the data corresponding to the three primary colors C, M and Y is 8-bit data represented by 256 gradation values, for example. The data corresponding to the three primary colors are subjected to suitable correction, and data corresponding to black (BK) is further produced on the basis of the data after the correction.

For example, the surface of a photoreceptor is scanned by a laser beam which is subjected to modulation based on the C data, to form an electrostatic latent image corresponding to cyan on the surface of the photoreceptor. The electrostatic latent image is developed into a toner image using cyan toner particles, and the cyan toner image is transferred onto copy paper. In the same manner, toner images in the respective colors, that is, magenta, yellow and black are transferred onto the copy paper on which the cyan toner image have been transferred one over the other with respect to the M data, the Y data and the BK data. Finally, the toner particles are heated and fixed to the copy paper, to achieve color copying.

In terms of the property of the copying machine, a document and a copy image can be easily compared with each other, whereby a demand for the reproducibility of the document is rigid. However, development characteristics and sensitivity characteristics of a photoreceptor differ among a plurality of copying machines, and the characteristics are affected by the use environment of the copying machine. Further, the development characteristics also differ based on cyan, magenta, yellow and black. In order to faithfully reproduce the color of the document, therefore, the toner particles in the four colors must be respectively adjusted individually for each copying machine.

Such adjustment is generally made by copying a standard color document having standard colors formed thereon to visually compare copies and the standard color document with each other. Correction factors for correcting the respective gradation values of cyan, magenta, yellow and black are set. The C data, the M data, the Y data and the BK data obtained from an output signal of the scanner are subjected to gradation correction by the correction factors, thereby to improve the reproducibility of colors.

In the above described so-called manual work, however, adjusting work is complicated. Moreover, an output image after the adjustment may vary due to the difference among adjusting workers.

A conventional technique for reducing the adjusting work is disclosed in Japanese Patent Laid-Open Gazette No. 41375/1989, for example. In this official gazette, a gradation correcting technique in a single-color image is mainly disclosed. First, a gradation scale is printed by applying a plurality of types of input data which differ in gradation values. The gradation characteristics of the printed gradation scale are measured by a reflectiometer. Correction factors are determined on the basis of the results of comparison between the measured value and a previously prepared reference value. If input data corresponding to the above described gradation scale are corrected by the determined correction factors, the gradation characteristics of the reference value are obtained.

The above described correction factors are determined by subjecting the results of the comparison between the measured value and the reference value to a predetermined functional operation.

In the above described prior art, the correction factors are respectively found with respect to gradation values of the gradation scale experientially printed on the basis of the results of the comparison between the measured value and the reference value. In order to strictly correct gradation output, therefore, the correction factors must be found with respect to a lot of gradation values. Therefore, the amount of operation is significantly increased, whereby long time is required for processing.

SUMMARY OF THE INVENTION

The present invention has been made in order to solve the above described technical problems and has for its object to provide an image forming apparatus capable of reducing the amount of operation for adjusting gradation output and consequently, reducing processing time for adjusting the gradation output.

Another object of the present invention is to provide a gradation output adjusting method in an image forming apparatus, in which the amount of operation for adjusting gradation output can be reduced and consequently, processing time for adjusting the gradation output can be reduced.

In accordance with a certain aspect, the present invention provides an image forming apparatus which is characterized by comprising image reading means for reading an image to output data each represented by gradation values corresponding to each of portions of the image, image forming means for forming an image on the basis of the data each represented by gradation values, gradation correcting means for correcting a gradation value of input data in accordance with a predetermined gradation correcting curve which can be variably set and inputting the data after the correction to the image forming means to adjust the density for image formation, curve pattern storing means for storing a plurality of types of curve patterns of the gradation correcting curve to be referred to by the gradation correcting means, means for inputting to the image forming means predetermined test data corresponding to an image including a plurality of regions which differ in gradation values to form an image corresponding to the test data, means for comparing an output of the image reading means in a case where the image formed on the basis of the test data is read by the image reading means with a predetermined reference value corresponding to the test data, finding a proper gradation value of data to be inputted to the image forming means with respect to a plurality of predetermined gradation values of the input data and calculating a pre-gradation correcting curve representing the relationship between the input data and the data to be inputted to the image forming means on the basis of the proper gradation value, and means for matching the calculated pre-gradation correcting curve with the curve patterns in the curve pattern storing means and setting the best matched curve pattern as the gradation correcting curve to be referred to by the gradation correcting means.

In accordance with another aspect, the present invention provides an image forming apparatus which is characterized by comprising image reading means for reading an image to output data each represented by gradation values corresponding to each of portions of the image, image forming means for forming an image on the basis of the data each represented by gradation values, Gradation correcting means for correcting a gradation value of input data in accordance with a predetermined gradation correcting curve which can be variably set and inputting the data after the correction to the image forming means to adjust the density for image formation, curve pattern storing means for storing a plurality of types of curve patterns of the gradation correcting curve to be referred to by the gradation correcting means, means for inputting to the image forming means predetermined test data corresponding to an image including a plurality of regions which differ in gradation values to form an image corresponding to the test data, means for comparing an output of the image reading means in a case where the image formed on the basis of the test data is read by the image reading means with a predetermined reference value corresponding to the test data, finding a proper gradation value of data to be inputted to the image forming means with respect to a plurality of predetermined gradation values of the input data and calculating a pre-gradation correcting curve representing the relationship between the input data and the data to be inputted to the image forming means on the basis of the proper gradation value, means for variably setting the slopes of the curve patterns stored in the curve pattern storing means on the basis of the results of the comparison between the output of the image reading means in a case where the image formed on the basis of the test data is read by the image reading means and the predetermined reference value, and means for matching the calculated pre-gradation correcting curve with the curve patterns whose slopes have been variably set and setting the best matched curve pattern out of the curve patterns whose slopes have been set as the gradation correcting curve to be referred to by the gradation correcting means.

In accordance with still another aspect, the present invention provides an image forming apparatus which is characterized by comprising image reading means for reading a color image to output color data each represented by gradation values corresponding to predetermined types of colors of the color image, image forming means for forming a color image using color materials in a plurality of colors on the basis of data for color materials represented by gradation values so as to respectively correspond to the plurality of color materials, gradation correcting means for correcting gradation values of input data for color materials in accordance with predetermined gradation correcting curves for color materials which are respectively set so as to correspond to the plurality of color materials and inputting the data after the correction to the image forming means to correct respective color gradation values of the color image formed by the image forming means, curve pattern storing means for storing a plurality of types of curve patterns of the gradation correcting curves to be referred to by the gradation correcting means, means for inputting to the image forming means test data for forming single-color test pattern images for color materials each including a plurality of regions which differ in gradation values in different regions of one paper to form an image corresponding to the test data, means for separately extracting outputs of the image reading means corresponding to the single-color test pattern images for color materials for each single-color test pattern image when the image formed on the basis of the test data is read by the image reading means, means for comparing the outputs of the image reading means which are separately extracted for each single-color test pattern image with predetermined reference values respectively corresponding to the plurality of color materials, finding proper gradation values of data to be inputted to the image forming means with respect to a plurality of predetermined gradation values of the input data on the basis of the results of the comparison and calculating pre-gradation correcting curves for color materials representing the relationship between the input data and the data to be inputted to the image forming means on the basis of the proper gradation values, and means for matching the pre-gradation correcting curves calculated with respect to the plurality of color materials with the curve patterns stored in the curve pattern storing means and respectively finding the best matched curve patterns for the plurality of color materials to set the curve patterns as the gradation correcting curves to be referred to by the gradation correcting means.

In accordance with another aspect, the present invention provides a gradation output adjusting method in an image forming apparatus comprising image reading means for reading an image to output data each represented by gradation values corresponding to each of portions of the image, image forming means for forming an image on the basis of the data each represented by gradation values, and gradation correcting means for correcting a gradation value of input data in accordance with a predetermined gradation correcting curve which can be variably set and inputting the data after the correction to the image forming means to adjust the density for image formation, which is characterized by comprising the steps of storing in curve pattern storing means a plurality of types of curve patterns of the gradation correcting curve to be referred to by the gradation correcting means, inputting to the image forming means predetermined test data corresponding to an image including a plurality of regions which differ in gradation values to form an image corresponding to the test data, comparing an output of the image reading means in a case where the image formed on the basis of the test data is read by the image reading means with a predetermined reference value corresponding to the test data, finding a proper gradation value of data to be inputted to the image forming means with respect to a plurality of predetermined gradation values of the input data and calculating a pre-gradation correcting curve representing the relationship between the input data and the data to be inputted to the image forming means on the basis of the proper gradation value, and matching the calculated pre-gradation correcting curve with the curve patterns in the curve pattern storing means and setting the best matched curve pattern as the gradation correcting curve to be referred to by the gradation correcting means.

In accordance with still another aspect, the present invention provides a gradation output adjusting method in an image forming apparatus comprising image reading means for reading an image to output data each represented by gradation values corresponding to each of portions of the image, image forming means for forming an image on the basis of the data each represented by gradation values, and gradation correcting means for correcting a gradation value of input data in accordance with a predetermined gradation correcting curve which can be variably set and inputting the data after the correction to the image forming means to adjust the density for image formation, which is characterized by comprising the steps of storing in curve pattern storing means a plurality of types of curve patterns of the gradation correcting curve to be referred to by the gradation correcting means, inputting to the image forming means predetermined test data corresponding to an image including a plurality of regions which differ in gradation values to form an image corresponding to the test data, comparing an output of the image reading means in a case where the image formed on the basis of the test data is read by the image reading means with a predetermined reference value corresponding to the test data, finding a proper gradation value of data to be inputted to the image forming means with respect to a plurality of predetermined gradation values of the input data and calculating a pre-gradation correcting curve representing the relationship between the input data and the data to be inputted to the image forming means on the basis of the proper gradation value, variably setting the slopes of the curve patterns stored in the curve pattern storing means on the basis of the results of the comparison between the output of the image reading means in a case where the image formed on the basis of the test data is read by the image reading means and the predetermined reference value, and matching the calculated pre-gradation correcting curve with the curve patterns whose slopes have been variably set and setting the best matched curve pattern out of the curve patterns whose slopes have been set as the gradation correcting curve to be referred to by the gradation correcting means.

In accordance with a further aspect, the present invention provides a gradation output adjusting method in an image forming apparatus comprising image reading means for reading a color image to output color data each represented by gradation values corresponding to predetermined types of colors of the color image, image forming means for forming a color image using color materials in a plurality of colors on the basis of data for color materials represented by gradation values so as to respectively correspond to the plurality of color materials, and gradation correcting means for correcting gradation values of input data for color materials in accordance with predetermined gradation correcting curves for color materials which are respectively set so as to correspond to the plurality of color materials and inputting the data after the correction to the image forming means to correct respective color gradation values of the color image formed by the image forming means, which is characterized by comprising the steps of storing in curve pattern storing means a plurality of types of curve patterns of the gradation correcting curves to be referred to by the gradation correcting means, inputting to the image forming means test data for forming single-color test pattern images for color materials each including a plurality of regions which differ in gradation values in different regions of one paper to form an image corresponding to the test data, separately extracting outputs of the image reading means corresponding to the single-color test pattern images for color materials for each single-color test pattern image when the image formed on the basis of the test data is read by the image reading means, comparing the outputs of the image reading means which are separately extracted for each single-color test pattern image with predetermined reference values respectively corresponding to the plurality of color materials, finding proper gradation values of data to be inputted to the image forming means with respect to a plurality of predetermined gradation values of the input data on the basis of the results of the comparison and calculating pre-gradation correcting curves for color materials representing the relationship between the input data and the data to be inputted to the image forming means on the basis of the proper gradation values, and matching the pre-gradation correcting curves calculated with respect to the plurality of color materials with the curve patterns stored in the curve pattern storing means and respectively finding the best matched curve patterns for the plurality of color materials to set the curve patterns as the gradation correcting curves to be referred to by the gradation correcting means.

According to the present invention, the data which is subjected to the gradation correction by the gradation correcting means is inputted to the image forming means, thereby to form the image whose density is adjusted. The adjustment of the gradation output is achieved by setting the gradation correcting curve referred to by the gradation correcting means to a proper curve.

The gradation correcting curve to be referred to by the gradation correcting means is selected from the plurality of types of curve patterns stored in the curve pattern storing means and is set. In selecting the curve pattern, the test data is first inputted to the image forming means. Consequently, the image forming means forms the image including the plurality of regions which differ in gradation values.

The image corresponding to the test data formed by the image forming means is read by the image reading means. The output of the image reading means at this time is compared with the predetermined reference value corresponding to the test data, and the pre-gradation correcting curve is calculated on the basis of the results of the comparison. The pre-gradation correcting curve is prepared by finding the proper gradation value of the data to be inputted to the image forming means with respect to the plurality of predetermined gradation values of the input data.

The calculated pre-gradation correcting curve and the plurality of types of curve patterns stored in the curve pattern storing means are then matched, whereby the best matched curve pattern is set as the gradation correcting curve.

In the present invention, the proper gradation value to be applied to the image forming means with respect to some gradation values of the input data is thus found to prepare the pre-gradation correcting curve. The pre-gradation correcting curve and the plurality of types of curve patterns are matched, thereby to make it possible to prepare the detailed gradation correcting curve. Consequently, it is possible to prepare the detailed gradation correcting curve by a small amount of operation.

According to the present intention, the output of the image reading means in a case where the image corresponding to the test data is read by the image reading means and the predetermined reference value corresponding to the test data are compared with each other, and the slopes of the curve patterns are variably set on the basis of the results of the comparison. The curve patterns whose slopes have been variably set and the pre-gradation correcting curve are matched, whereby the best matched curve pattern out of the curve patterns whose slopes have been set is set as the gradation correcting curve to be referred to by the gradation correcting means. Consequently, it is possible to obtain a suitable gradation correcting curve using a small number of curve patterns.

Furthermore, according to the present invention, the adjustment of the gradation output in the image forming apparatus for forming the color image using the color materials in the plurality of colors are made. The test data used in the case is data for forming the single-color test pattern images for color materials each including the plurality of regions which differ in gradation values in different regions of one paper. The images formed by applying the test data to the image forming means are read by the image reading means. At this time, the outputs of the image reading means are separately extracted for the single-color test pattern images respectively corresponding to the plurality of color materials. The data for the single-color test pattern images for color materials are compared with the predetermined values. As a result, the pre-gradation correcting curves for color materials are calculated.

Thereafter, the calculated pre-gradation correcting curves and the plurality of types of curve patterns are matched, thereby to set the gradation correcting curves for the respective color materials.

According to the present invention, the adjustment of the gradation output with respect to the plurality of color materials used for forming the color image by the image forming means can be achieved by forming and reading the test pattern images on one paper.

According to the present invention, the pre-gradation correcting curves corresponding to some gradation values are prepared, and the pre-gradation correcting curves and the plurality of types of curve patterns are matched, thereby to produce the detailed gradation correcting curve. Consequently, it is possible to obtain the detailed gradation correcting curve by a small amount of operation. Consequently, it is possible to significantly reduce processing time for adjusting the gradation output.

Furthermore, according to the present invention, the slopes of the plurality of types of curve patterns are variably set, thereby to make it possible to obtain a suitable gradation correcting curve using a small number of curve patterns.

Additionally, according to the present invention, the adjustment of the gradation output with respect to the plurality of color materials used for forming the color image by the image forming means can be achieved by forming and reading the test pattern images on one paper. Consequently, it is possible to adjust the gradation output in a short time.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram for explaining a test pattern image formed on the basis of test data;

FIG. 7 is a diagram for explaining a matching method of a pre-gradation correcting curve and a curve pattern;

FIG. 11 is a diagram for explaining processing in a case where data for finely adjusting gradation output is produced;

FIG. 12 is a diagram for explaining processing in a case where data for finely adjusting gradation output is produced;

FIG. 13 is a diagram for explaining another example of a matching method of a pre-gradation correcting curve and a curve pattern;

FIGS. 14 (a), 14 (b), 14 (c) and 14 (d) are diagrams for explaining the details of a matching technique;

FIG. 15 is a diagram for explaining still another example of a matching method of a pre-gradation correcting curve and a curve pattern;

FIG. 16 is a diagram for explaining a further example of a matching method of a pre-gradation correcting curve and a curve pattern;

FIG. 17 is a diagram for explaining the construction of a color image sensor;

FIG. 18 is a diagram for explaining an example of a test pattern image formed in a second embodiment of the present invention.

DETAILED DESCRIPTION OF THE PREFERRED EMBODIMENTS

Figure 1:
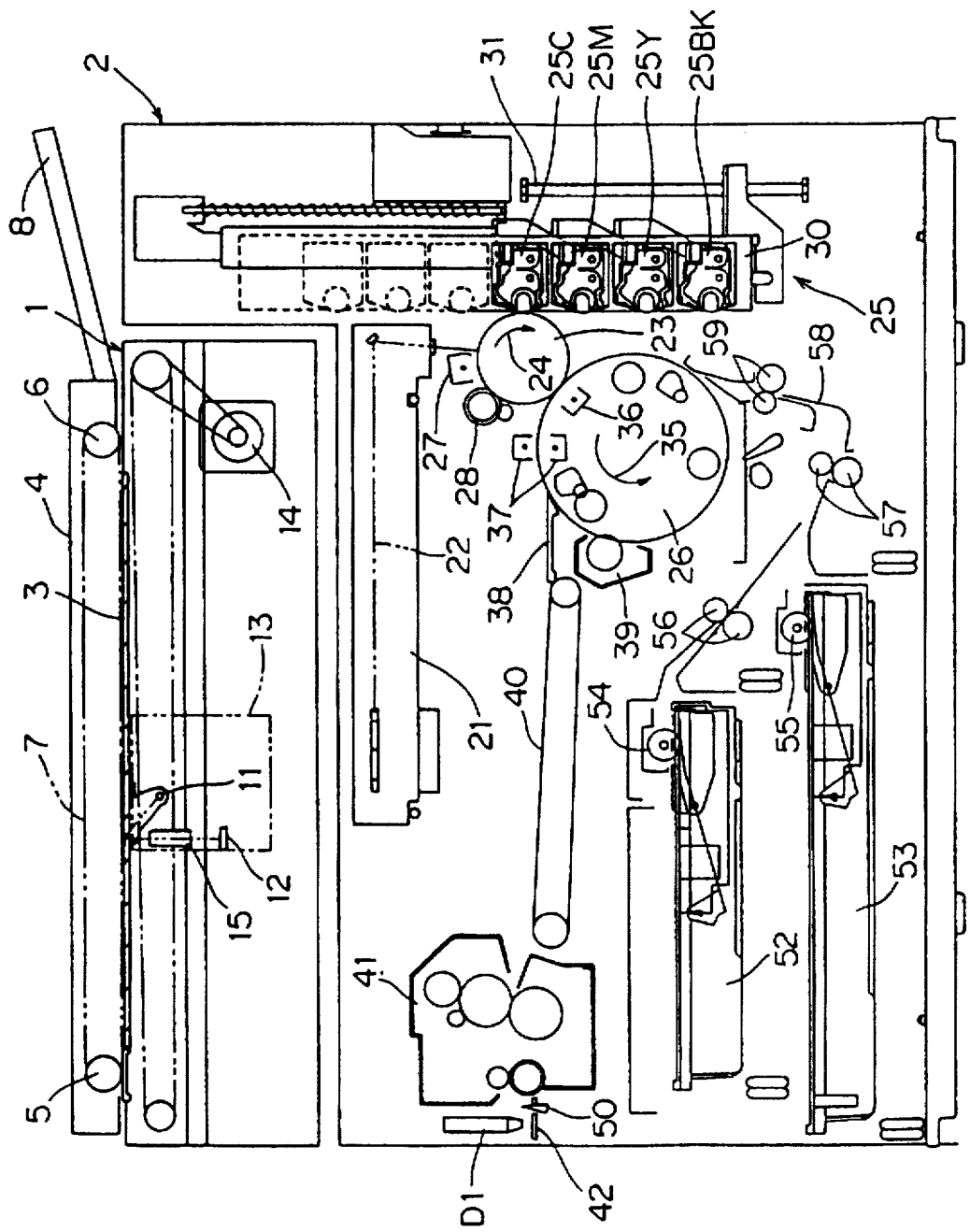
FIG. 1 is a cross sectional view schematically showing the internal construction of a color copying machine to which one embodiment of the present invention is applied.

FIG. 1 is a cross sectional view schematically showing the internal construction of a color copying machine to which one embodiment of the present invention is applied. The color copying machine has a scanner section 1 for reading a document, and a printer section for processing a signal from the scanner section 1 to form a color image. A transparent plate 3 on which a document is set is provided above the scanner section 1. An automatic document feeder 4 is further provided above the transparent plate 3. The automatic document feeder 4 has a pair of drive rollers 5 and 6 and an endless belt 7 wound around the pair of drive rollers 5 and 6. By this automatic document feeder 4, a plurality of documents (not shown) set on a document tray 8 are fed onto the transparent plate 3 one at a time and are set in the position for reading.

A scanning and reading section 13 comprising a light source 11 and a one-dimensional color CCD (Charge Coupled Device) image sensor 12 is displaced back and forth along the transparent plate 3 upon receipt of a driving force from an optical motor 14 below the transparent plate 3. Consequently, the document mounted on the transparent plate 3 is illuminated and scanned. In the process of the illumination and scanning, light emitted from the light source 11 is reflected from the surface of the document, and the reflected light is incident on the image sensor 12 through a lens 15. As a result, an output of the image sensor 12 outputted in time series becomes a signal representing an image formed on the surface of the document.

Signals representing the three primary colors, red, green and blue are outputted from the color image sensor 12. The signals are respectively converted into digital data by an analog-to-digital converter (not shown) provided for the scanner section 1, and further converted into C, M and Y data corresponding to cyan (C), magenta (M) and yellow (Y) which are the three primary colors (subtractive). The data are respectively 8-bit data, for example. Therefore, each of the C, M and Y data is data represented by 256 gradation values.

The C, M and Y data are applied to the printer section 2. In the printer section 2, the C, M and Y data are subjected to predetermined processing, and BK data corresponding to black is further produced in addition to the C, M and Y data. Video signals respectively corresponding to the C, M, Y and BK data are produced, and are applied in this order to a laser scanning unit 21.

Laser light 22 emitted from the laser scanning unit 21 is introduced into a photoreceptor 23 in a right circular cylinder shape, to expose the photoreceptor 23. The photoreceptor 23 is rotated in a direction indicated by an arrow 24 around its axis. The surface of the photoreceptor 23 before the exposure is uniformly charged. Therefore, an electrostatic latent image corresponding to modulation to which the laser right 22 is subjected is formed on the surface of the photoreceptor 23 by the exposure using the laser right 22.

The electrostatic latent image is developed into a toner image by a developing section 25. The toner image is transferred onto copy paper (not shown) wound around a transfer drum 26 in a right circular cylinder shape which is arranged in close proximity to the surface of the photoreceptor 23. The surface of the photoreceptor 23 on which the toner image has been transferred is cleaned by a cleaning device 28.

The developing section 25 has a holding member 30 for arranging developing cartridges 25C, 25M, 25Y and 25BK respectively holding cyan, magenta, yellow and black toner particles in this order and holding the developing cartridges, and an up-and-down mechanism 31 for raising and lowering the holding member 30. By this construction, the developing cartridges 25C, 25M, 25Y and 25BK are switched in conformity to the C, M, Y and BK video signals applied to the laser scanning unit 21 and abut against the photoreceptor 23. Consequently, respective cyan, magenta, yellow and black toner images are sequentially formed on the surface of the photoreceptor 23.

The transfer drum 26 is rotated in a direction indicated by an arrow 35 around its axis so that the peripheral velocity thereof becomes equal to the peripheral velocity of the photoreceptor 23. A transfer device 36 for transferring toner particles on the surface of the photoreceptor 23 onto copy paper wound around the transfer drum 26 by high-frequency discharges is provided inside the transfer drum 26. In addition, a pair of separators 27 for making the separation of the copy paper easy by corona discharges is arranged on the downstream side of the transfer device 36 in the direction of rotation of the transfer drum 26. A separating claw 38 for separating from the transfer drum 26 the copy paper on which the toner image has been transferred is provided on the downstream side of the separator 37.

A cleaning device 39 for cleaning the surface of the transfer drum 26 from which the copy paper has been separated is further provided around the transfer drum 26. The separating claw 38 and the cleaning device 39 are constructed movably toward and apart from the transfer drum 26.

The copy paper separated from the transfer drum 26 by the separating claw 38 is introduced by a conveying section 40 into a fixing section 41, where fixing processing of the toner image on the surface of the copy paper is performed. The copy paper on which the toner image has been fixed is discharged outward through a paper discharge path 42.

The copy paper is stacked in cassettes 52 and 53, is delivered by paper feeding rollers 54 and 55, and is introduced into a conveying path 58 by conveying rollers 56 and 57. The timing for paper feeding is finely adjusted by a registration roller 59 in the vicinity of the transfer drum 26, after which the copy paper is fed toward the transfer drum 26. The fed copy paper is held by a clip mechanism (not shown), and is wound around the transfer drum 26 as the transfer drum 26 is rotated.

The copy paper wound around the transfer drum 26 is held on the surface of the transfer drum 26 before the transfer of the respective cyan, magenta, yellow and black toner images is terminated. In a time period during which the cyan, magenta and yellow toner images are formed on the copy paper, the separating claw 38 and the cleaning device 39 are caused to retreat in positions separated from the transfer drum 26. If the toner images in the three colors are transferred onto the copy paper, the separating claw 38 and the cleaning device 39 are brought into contact with the transfer drum 26, to induce discharges in the separator 37.

If a front end of the copy paper on which the toner image in the fourth color, that is, the black toner image has been transferred reaches the separating claw 38, the holding by the clip mechanism is released. The copy paper separated by the separating claw 38 is introduced into the fixing section 41 through the conveying section 40.

Of course, when single-color copies are made by the black toner particles, for example, the separating claw 38 and the cleaning device 39 are caused to abut on the transfer drum 26 from the beginnings whereby the copy paper does not lead to the vicinity of the cleaning device 39.

Figure 2:
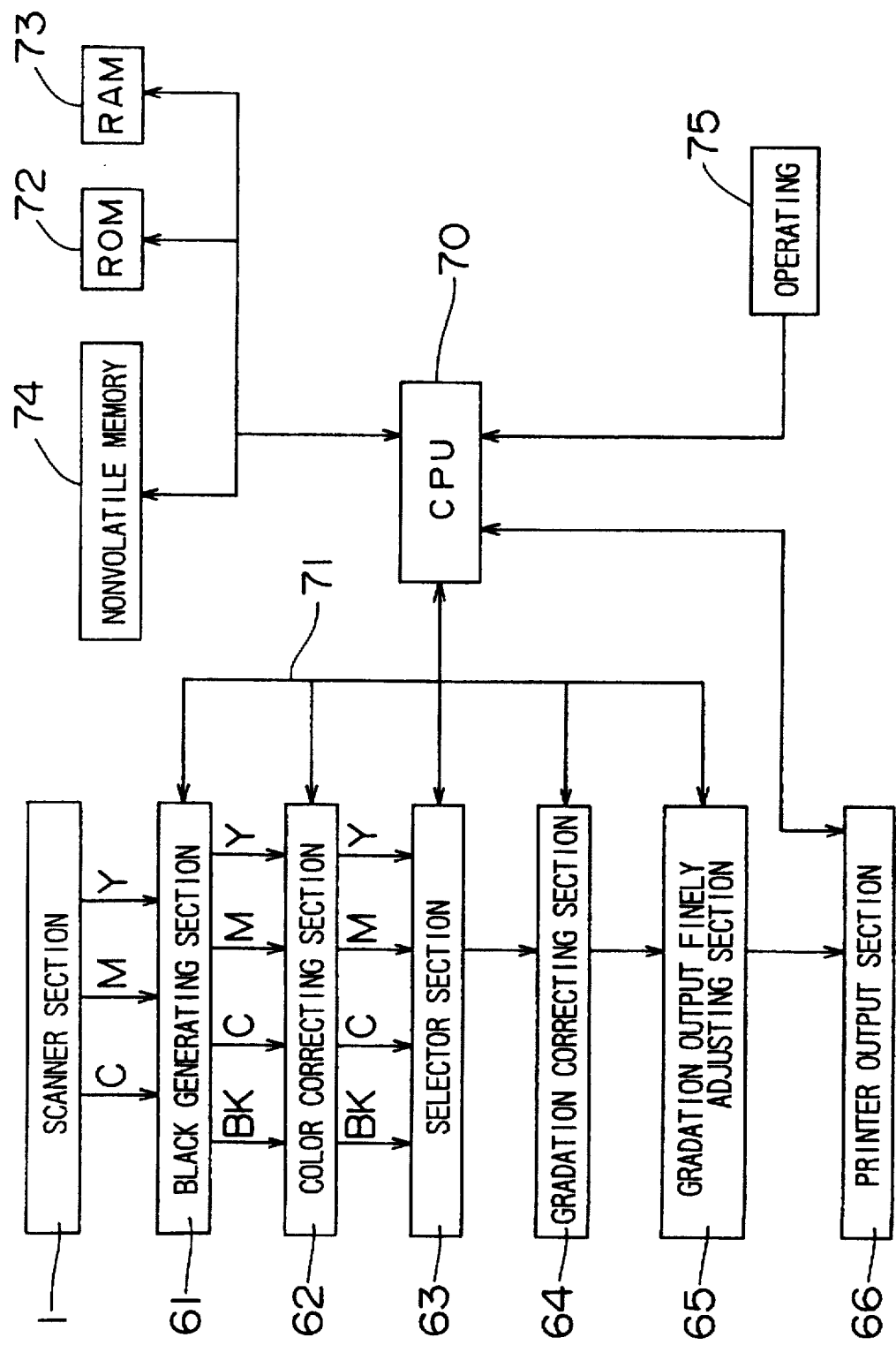
FIG. 2 is a block diagram showing the electrical construction of the color copying machine.

FIG. 2 is a block diagram showing the electrical construction of main sections of the above described color copying machine. C, M and Y primary-color data are produced from the scanner section 1. The data are applied to a black generating section 61, where the C, M and Y data are corrected, and BK data corresponding to black toner particles is produced.

The C, M, Y and BK data are subjected to so-called masking processing or the like in a color correcting section 62 and then, are applied to a selector section 63. The selector section 63 selects the data in any one of the colors corresponding to a signal to be applied to the laser scanning unit 21, to output the same to a gradation correcting section 64. In the gradation correcting section 64, the data is subjected to gradation correction for each color depending on the sensitivity characteristics of the photoreceptor 23 and the development characteristics of the developing section 25. That is, the data for the respective colors are individually increased or decreased.

The data after the gradation correction is further inputted to a gradation output finely adjusting section 65. In the gradation output finely adjusting section 65, the data is subjected to gradation fine adjustment depending on the environmental conditions under which the color copying machine is located. The data after the fine adjustment is applied to a printer output section 66 including the above described laser scanning unit 21 and the like.

The control and the operation of each of the sections are carried out in a CPU (Central Processing Unit) 70. The CPU 70 is connected to a bus 71. The black generating section 61, the color correcting section 62, the selector section 63, the gradation correcting section 64, the gradation output finely adjusting section 65, and the like are connected to the bus 71. A ROM (Read-Only Memory) 72 storing operation programs and the like, a RAM (Random Access Memory) 73 used as a work area or the like, and a nonvolatile memory 74 in which data referred to by the gradation correcting section 64 and the gradation output finely adjusting section 65 are written are further connected to the CPU 70.

A signal from an operating section 75 located on the upper surface of the scanner section 1 is further inputted to the CPU 70. An adjustment mode key (not shown) is provided in the operating section 75. If the adjustment mode key is operated, the CPU 70 is shifted to an adjustment mode for preparing a gradation correcting curve. The gradation correcting curve is a curve referred to when the gradation correcting section 64 performs gradation correction processing, which represents a correspondence between gradation input from the selector 63 and gradation output to the printer output section 66.

In the adjustment mode, four types of test data corresponding to the four colors C, M, Y and BK are applied to the printer output section 66, where an operation for forming four images is experientially performed. The test data are produced by the CPU 70 on the basis of a test data producing program previously stored in the ROM 72. The test data produced by the CPU 70 are inputted to the printer output section 66 without being subjected to processing in the gradation correcting section 64 and the gradation output finely adjusting section 65.

FIG. 3 is a diagram for explaining an example of a test pattern image for gradation adjustment formed by applying the test data to the printer output section 66. The four types of test data produced by the CPU 70 respectively correspond to gradation scales of C, M, Y and BK single-color images. Specifically, rectangular test images TP1, TP2, TP3, . . . which have predetermined dimensions and differ in density are arranged in a matrix on the surface of copy paper 77. The larger a subscript i is, the higher the density of each of the test images TPi (i=1, 2, 3, 4, . . . ) is. Specifically, such a gradation scale that the density is higher on the right and lower sides of FIG. 3. The difference in density due to the effect such as the non-uniformity in sensitivity of the photoreceptor 23 only exists within each of the test images TPi, whereby the density of the test image is basically uniform.

The gradation adjusting test pattern is read by the scanner section 1, as described later. A position marker PM is formed in a predetermined position which is scanned by the scanner section 1 earlier than the test images TP1, TP2, TP3, . . . . The position marker PM has a predetermined positional relationship with the test images TP1, TP2, . . . . Therefore, the position of the position marker PM is detected, thereby to make it possible to know the timing at which the scanner section 1 reads each of the test images TP1, TP2, TP3, . . . .

Figure 4:
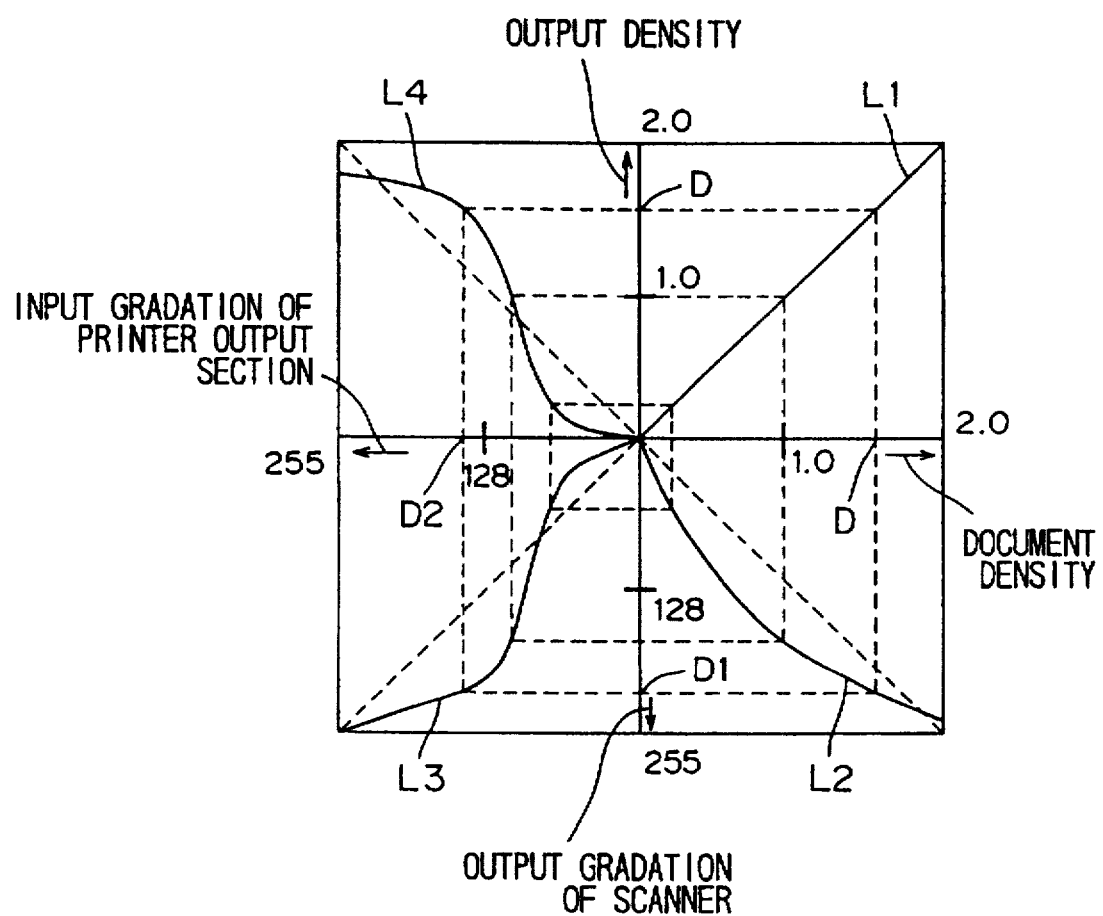
FIG. 4 is a diagram for explaining the principle in a case where a gradation correcting curve is prepared.

FIG. 4 is a diagram for explaining the principle of gradation output adjustment processing in the above described adjustment mode. Processing in the gradation correcting section 64 is to correct output data of the selector section 63 so as to obtain copies faithful to a document. Consequently, if the relationship between the density of the document and the density of copies outputted conforms to a straight line L1, gradation output adjustment is completely made, thereby to make it possible to obtain copies in which the density of the document is faithfully reproduced.

There are roughly two factors which affect the relationship between the density of the document and the density of the copies. One is the reading characteristics of the scanner section 1, and the other is the output characteristics of the printer output section 66. The input-output characteristics of the scanner section 1 have gamma characteristics, and the relationship between the density of the document and gradation values of the output data of the scanner section 1 conforms to a curve L2. On the other hand, the input-output characteristics of the printer output section 66 depend on the sensitivity of the photoreceptor 23 and the characteristics of toner particles and conforms to a curve L4, for example. The characteristics significantly differ among a plurality of copying machines, and differ based on colors of toner particles.

If an output gradation value D1 of the scanner section 1 corresponding to an arbitrary document density D is corrected so that the output density of the printer section 2 becomes D, to obtain an input gradation value D2 of the printer output section 66, the document density can be faithfully reproduced. That is, the output gradation value of the scanner section 1 is subjected to gradation correction conforming to a curve L3, thereby to make it possible to absorb the effects of the reading characteristics of the scanner section 1 and the input-output characteristics of the printer output section 66.

The function of the above described gradation correcting section 64 is to subject the output data of the scanner section 1 to suitable gradation correction and apply the same to the printer output section 66. In the above described processing in the adjustment mode, a gradation correcting curve conforming to the curve L3 is prepared. The prepared gradation correcting curve is stored in the nonvolatile memory 74, and is referred to by the gradation correcting section 64.

When a gradation correcting curve is actually prepared, the output characteristics of a printer output section in a standard copying machine whose output density has been adjusted are referred to as a standard output characteristic curve. The standard output characteristic curve is stored in the ROM 72. The output characteristics of the printer output section 66 in the copying machine to be adjusted are examined, and a gradation correcting curve is calculated on the basis of the deviation between the output characteristics and the above described reference output characteristics curve.

Figure 5:
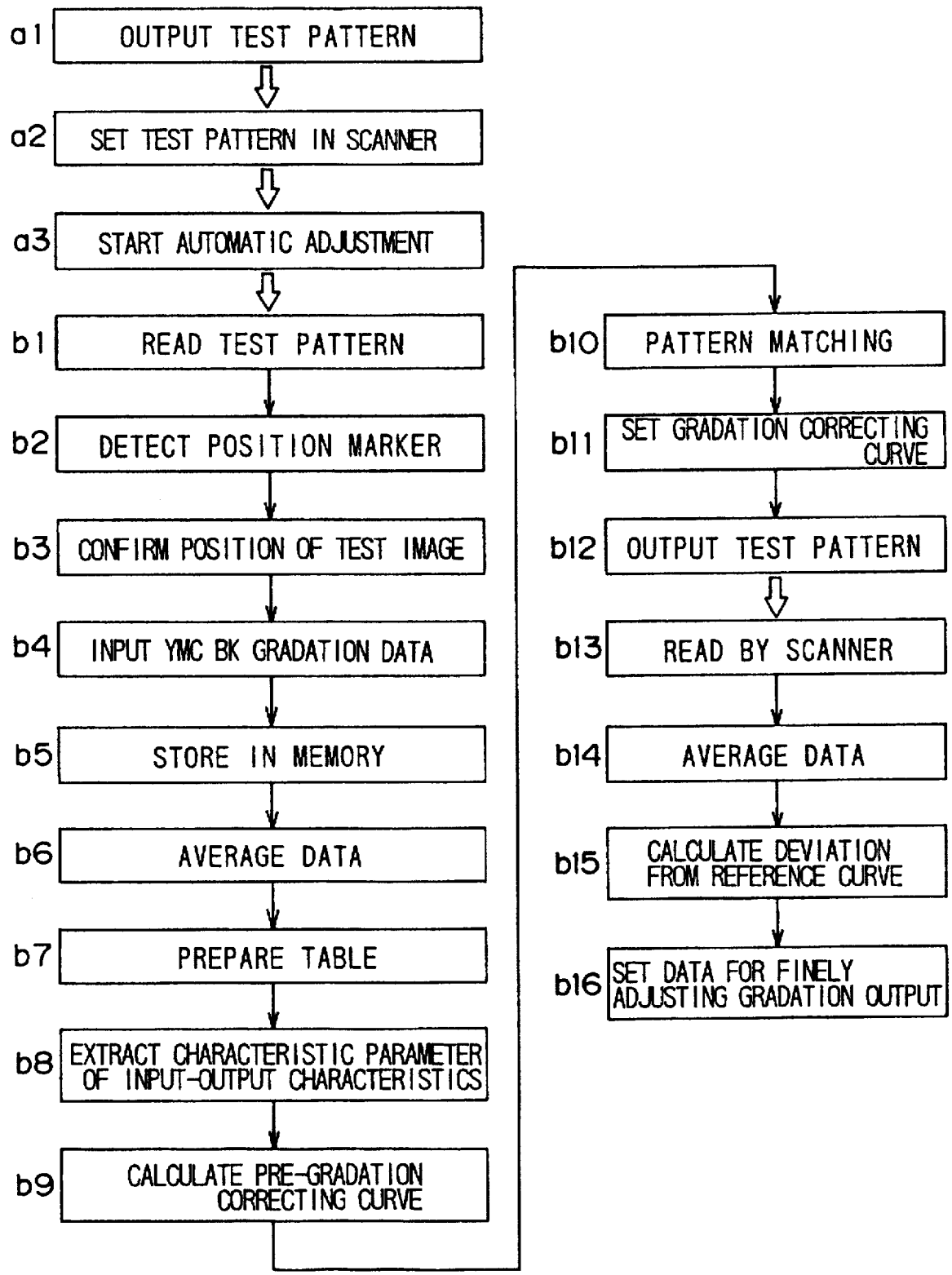
FIG. 5 is a diagram for explaining the procedure for processing in a case where a gradation correcting curve is prepared.

FIG. 5 is a diagram for explaining the procedure for processing in the adjustment mode. In producing a gradation correcting curve, the gradation adjusting test pattern image described with reference to FIG. 3 is printed and outputted (step a1). The printed test pattern image is disposed with the bottom up on the transparent plate 3 in the scanner section 1 (step a2). In this state, if a keying operation for automatic adjustment is performed from the operating section 75, an automatic adjusting operation is started (step a3). Thereafter, the above described gradation correcting curve is automatically prepared by internal processing.

First, the test pattern image is read by the scanner section 1 (step b1). If the reading of the test pattern image is started, the position marker PM (see FIG. 3) in the test pattern image is detected (step b2). The CPU 70 confirms the position of a test image at each gradation value on the basis of the position of the position marker PM (step b3). Specifically, the test pattern image is a gradation scale in a predetermined pattern, and the position of the test image at each gradation value is specified on the basis of the relative positional relationship with the position marker PM.

If data (data corresponding to the gradation scale of any one of M, C, Y and BK images) is read by the scanner section 1 (step b4), the data is stored in the RAM 73 once (step b5). The data set in the RAM 73 is read out, and the average value of the data is operated for each test image (step b6). A table representing a correspondence between test data corresponding to each of the test images and data representing the average of dots constituting the test image is prepared (step b7). This table corresponds to the input-output characteristics of the printer output section 66, which corresponds to the curve L4 shown in FIG. 4. An output of the scanner section 1 reflects scanner characteristics corresponding to the curve L2. If the input-output characteristics of the scanner section 1 are previously corrected so that the characteristics of the curve L2 are changed into the characteristics of the curve L2, the effect of the reading characteristics of the scanner section 1 is eliminated, thereby to obtain the actual output characteristics of the printer output section 66.

A characteristic parameter of the input-output characteristics of the printer output section 66 found in the above described manner is then extracted (step b8). Examples of the characteristic parameter extracted at this time include the slope of a straight line portion and a changed point of a curve corresponding to the output characteristics. The changed point is a point at which the slope of the curve is rapidly changed.

Furthermore, a pre-gradation correcting curve is calculated on the basis of the reading characteristics of the scanner section 1 and the output characteristics of the printer output section 66 (step b9), and is stored in the RAM 73. The calculation of the pre-gradation correcting curve is performed on the basis of the results obtained in comparing the output characteristics of the printer output section 66 with the above described reference output characteristic curve. The pre-gradation correcting curve calculated at this time only has discrete values corresponding to the gradation values of the test images constituting the test pattern image. Consequently, the pre-gradation correcting curve cannot be directly used, whereby a detailed gradation correcting curve in the whole gradation section must be further prepared so as to conform to the pre-gradation correcting curve.

In order to prepare the detailed gradation correcting curve in the whole gradation section, a plurality of types of curve patterns of the detailed gradation correcting curve corresponding to the input-output characteristics which the printer output section 66 may have.

The gradation correcting curve used in the gradation correcting section 64 is prepared by matching the pre-gradation correcting curve calculated in the step b9 and the curve patterns stored in the ROM 72 (steps b10 and b11). That is, the curve pattern which is best matched with the pre-gradation correcting curve is set as the detailed gradation correcting curve to be referred to when gradation correction processing is performed by the gradation correcting section 64. Color balance adjustment processing as described later is performed prior to the above described pattern matching.

If the gradation correcting curve is set, data for fine adjustment in the gradation output finely adjusting section 65 is then produced. Specifically, data obtained by subjecting the test data to correction based on the set gradation correcting curve is applied to the printer output section 66, where the test pattern image is printed again (step b12). The printed test pattern image is set in the scanner section 1 and is read (step b13). The average value of the data for the respective test images is found (step b14), and the deviation between the average value and the above described reference output characteristic curve stored in the ROM 72 is calculated (step b15).

If the deviation between the outputted test pattern image and the reference output characteristic curve is calculated, the data for finely adjusting gradation output is set in the nonvolatile memory 74 on the basis of the deviation (step b16). Consequently, adjustment with respect to one of the colors Y, M, C and BK is terminated.

The same adjustment is carried out with respect to the other three colors. At the time point where the adjustment with respect to all the colors is completed, four gradation correcting curves respectively corresponding to Y, M, C and BK and four data for finely adjusting gradation output have been produced and stored in the nonvolatile memory 74.

Figure 6:
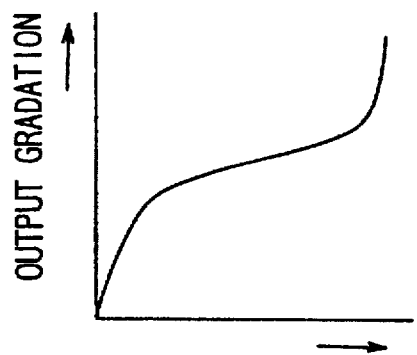
FIGS. 6 (a) and 6 (b) are diagrams for explaining processing in a case where a gradation correcting curve is set by pattern matching.
Figure 6:
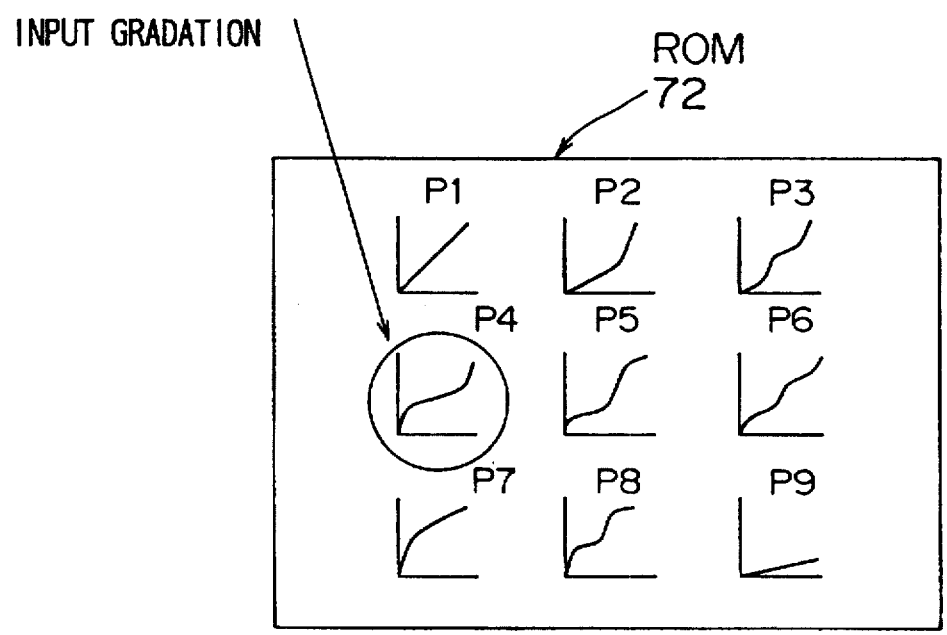

FIGS. 6 (a) and 6 (b) are diagrams for explaining the processing for producing a gradation correcting curve in more detail. A predetermined number of curve patterns P1, P2, P3, . . . produced on the basis of experience are stored in the ROM 72, as shown in FIG. 6 (b). The curve patterns are stored as a table of output data corresponding to all gradation values of input data.

For example, it is assumed that a pre-gradation correcting curve calculated by printing a test pattern image and reading the same by the scanner section 1 is as shown in FIG. 6 (a). It is the curve pattern P4 which is closest to the calculated pre-gradation correcting curve. In this case, therefore, the output pattern P4 is employed as a gradation correcting curve.

FIG. 7 is a diagram for explaining a matching method of the calculated pre-gradation correcting curve and the curve pattern stored in the ROM 72. The pre-gradation correcting curve only actually has not values related to all gradation values but values related to a relatively small number of gradation values. For example, it is assumed that such a pre-gradation correcting curve has actual values only with respect to input gradation values G0, G2, G3, . . . , G8. At this time, differences ΔX0, ΔX1, . . . , ΔX8 between values on the pre-gradation correcting curve PG which are calculated with respect to the gradation values G0, G2, . . . , G8 and respective values on a curve pattern Pj (j=1, 2, 3, . . . ) are operated. Further, the sum ΔX of the differences is operated, as expressed by the following equation (1):

$$\Delta X = \{\Delta X0\} + \ldots + \{\Delta X8\} \tag{1}$$

Such an operation is executed with respect to all the curve patterns stored in the ROM 72, and the curve pattern in which the above described sum ΔX is minimum out of the curve patterns is found out. Such a curve pattern is employed as a gradation correcting curve, and is used for gradation correction processing in the gradation correcting section 64.

The whole gradation section may be divided into a low gradation section R1, a middle gradation section R2 which is a straight line portion and a high gradation section R3, to carry out pattern matching in the whole gradation section in such a manner that a matching method using the operation conforming to the foregoing equation (1) is used in the low gradation section R1 and the high gradation section R3 and the slope of a straight line is compared between the pre-gradation correcting curve and the curve pattern in the middle gradation section R2, or to carry out pattern matching on the basis of the number of changed points and the slope in the low gradation section R1 and the high gradation section R3.

Figure 8:
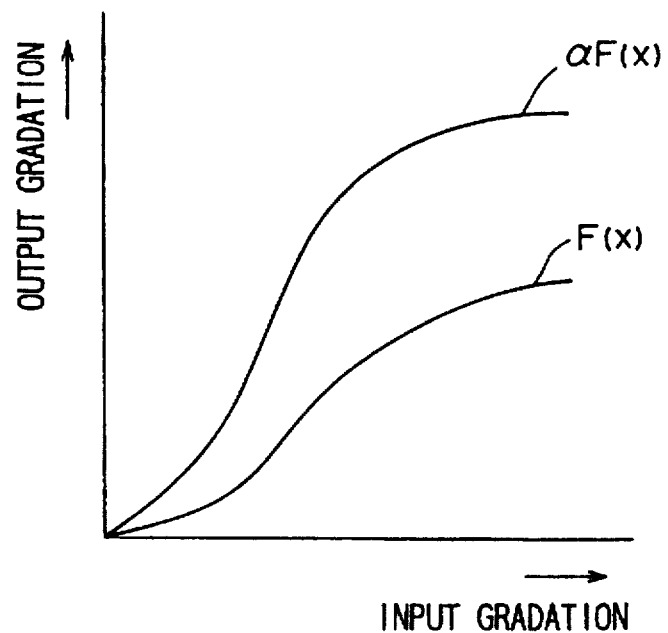
FIG. 8 is a diagram for explaining the adjustment of color balance.

FIG. 8 is a diagram for explaining color balance adjustment processing. The curve patterns of the gradation correcting curve stored in the ROM 72 are multiplexed by a color balance offset when they are used. Specifically, assuming that the curve pattern is represented by a function F(x) of input gradation values x, a gradation correcting curve actually used is αF(x) obtained by multiplexing F(x) by a color balance offset α. If the color balance offset α is changed, therefore, the slope of the gradation correcting curve is changed.

The color balance offset a is set prior to pattern matching of the gradation correcting curve on the basis of the deviation between the actual output characteristics of the printer output section 66 and the reference output characteristic curve. Consequently, the pattern matching is carried out between the pre-gradation correcting curve and the curve pattern whose slope has been variably set.

As a result of performing such processing, the slope of the curve pattern in the ROM 72 can be freely changed, whereby curve patterns corresponding to various types of slopes need not be stored in the ROM 72. That is, too many curve patterns need not be previously prepared and stored in the ROM 72.

Figure 9:
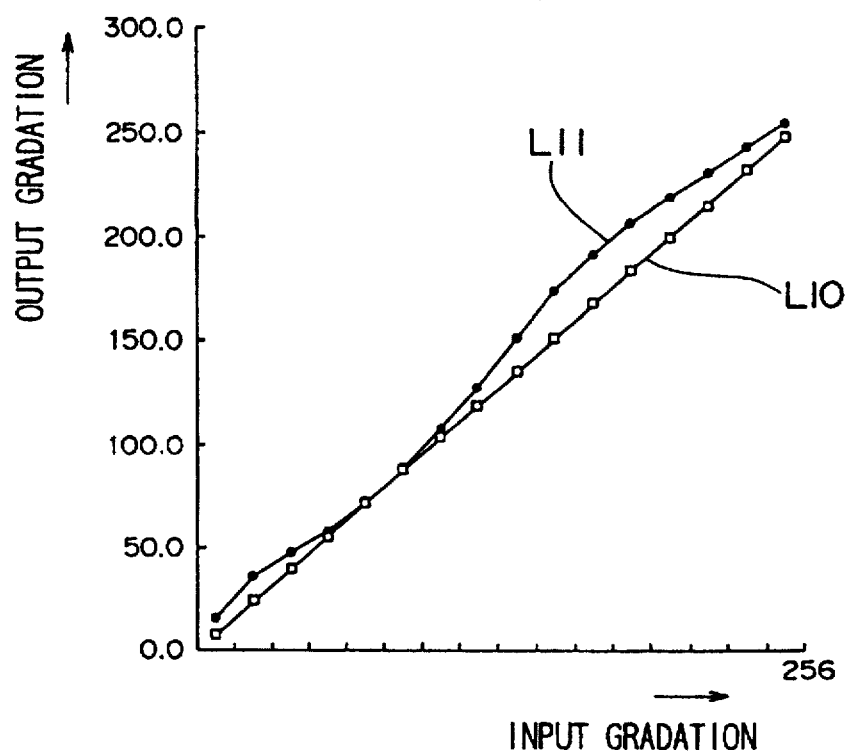
FIG. 9 is a diagram showing an actual gradation correcting curve.
Figure 10:
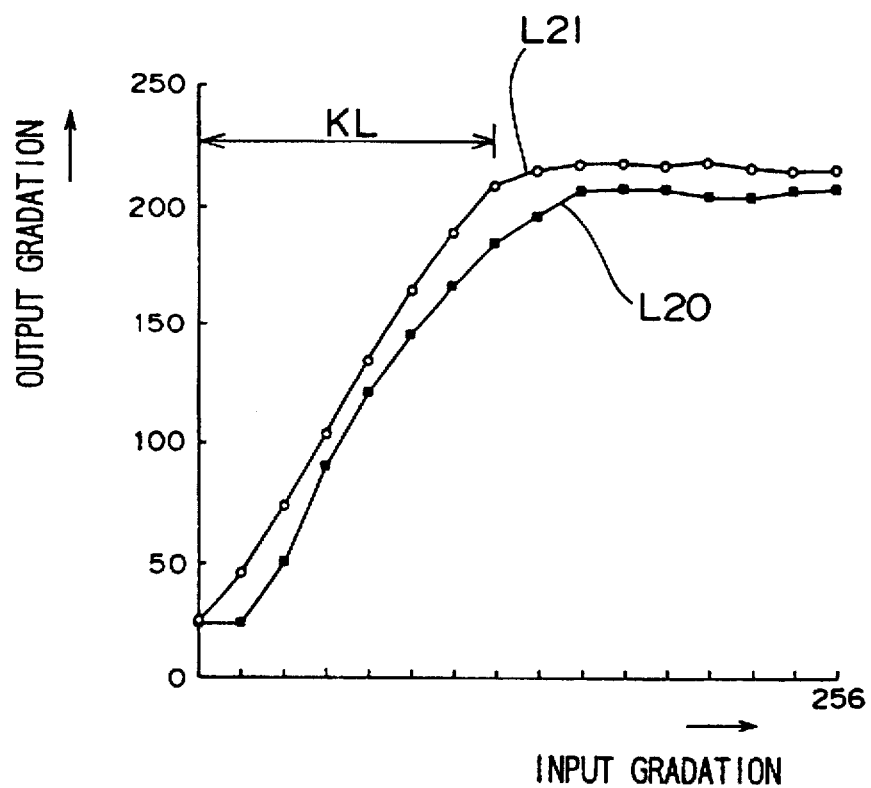
FIG. 10 is a diagram showing the relationship between gradation values of input data inputted to a gradation correcting section and gradation values of an image outputted from a printer output section 66.

FIG. 9 is a diagram showing the actual gradation correcting curve, in which the input-output characteristics of the gradation correcting section 64 are illustrated. FIG. 10 is a diagram showing the actual output characteristics of the printer section 66, in which the relationship between gradation values of input data to the gradation correcting section 64 and gradation values of an image from the printer output section 66 is illustrated. Respective curves shown in FIGS. 9 and 10 correspond to cyan.

It can be said that a gradation correcting curve in a case where no gradation correction is made is a straight line L10. That is, corresponding input and output gradation values become equal to each other. The output characteristics of the printer output section 66 in a case where no gradation correction is made in the gradation correcting section 64 conform to a curve L20 shown in FIG. 10. A gradation correcting curve prepared by the above described processing is a curve L11, for example. If data which is subjected to a gradation correction in accordance with the curve L11 is applied to the printer output section 66, the output characteristics of the printer output section 66 conform to a curve L21. In the output characteristics of the curve L21, the input-output characteristics become linear in a section KL. If the section KL is used, therefore, it is possible to satisfactorily represent a halftone image such as a picture image.

FIGS. 11 and 12 are diagrams for explaining processing performed when data for finely adjusting gradation output is produced, in which the relationship between input gradation values of the gradation correcting section 64 and output gradation values of the printer output section 66 is illustrated. For example, it is assumed that the input-output characteristics of components from the gradation correcting section 64 to the printer output section 66 conform to a curve g1 in the step in which a gradation correcting curve is set. In this case, the gradation is finely adjusted for every 25 gradation values, for example, on the basis of the deviation between the actual output characteristics of the printer output section 66 and the above described reference output characteristic curve. An input-output characteristic curve after the fine adjustment is indicated by a curve g2. Further, a portion where the relationship between the increase or decrease of input gradation values and the relationship between the increase or decrease of output gradation values are inverted, as indicated by reference sign Q, is subjected to correction so that the inversion can be solved. An input-output characteristic curve after the correction is indicated by a curve g3 in FIG. 12.

The data for output gradation fine adjustment processing takes a value obtained by subtracting an input gradation value corresponding to the curve g3 from an input gradation value corresponding to the curve g1, as indicated by reference sign DA1, DA2 , . . . . . The value is found for each gradation value and is stored in the nonvolatile memory 74, which is used for processing in the gradation output finely adjusting section 65. The gradation output finely adjusting section 65 realizes input-output characteristics conforming to the curve g3 by changing gradation values of data inputted to the printer output section 66.

As described in the foregoing, according to the present embodiment, the test pattern image which is a gradation scale is printed and outputted, and the test pattern image is read by the scanner section 1. The output characteristics of the printer output section 66 are found on the basis of the results of the reading, and values on the gradation correcting curve are calculated with respect to some gradation values on the basis of the found output characteristics. The pre-gradation correcting curve calculated on the basis of the calculated values and the curve pattern in the ROM 72 are matched, thereby to prepare a detailed gradation correcting curve. The gradation correcting curve is used for gradation correction processing in the gradation correcting section 64.

After the values on the gradation correcting curve are thus found with respect to some gradation values, the gradation correcting curve is found by only matching processing with a previously prepared curve pattern, thereby to make it possible to find a gradation correcting curve by a small amount of operation without requiring a complicated operation. Therefore, it is possible to reduce processing time required to adjust gradation output.

FIG. 13 is a diagram for explaining another technique for producing a detailed gradation correcting curve by matching of a calculated pre-gradation correcting curve with curve patterns stored in the ROM 72. In this example, the whole gradation section is divided into three sections, that is, a low gradation section R1, a middle gradation section R2 and a high gradation section R3. Pattern matching with curve patterns P1, P2, . . . is carried out with respect to the respective sections R1, R2 and R3. For example, it is assumed that the curve pattern P2 is best matched with a portion of the pre-gradation correcting curve in the low gradation section R1, the curve pattern P1 is best matched with a portion of the pre-gradation correcting curve in the middle gradation section R2, and the curve pattern P7 is best matched with a portion of the pre-gradation correcting curve in the high gradation section R3. In this case, the curve patterns P2, P1 and P7 are respectively employed as gradation correcting curves in the low gradation section R1, the middle gradation section R2 and the high gradation section R3. The curve patterns P2, P1 and P7 are coupled to each other, thereby to reconstruct the gradation correcting curve in the whole gradation section.

In order to couple the curve patterns which are respectively best matched with the gradation sections R1, R2 and R3, plots PR1 and PR2 are respectively provided in boundaries between the sections R1, R2 and R3 in the pre-gradation correcting curve. The plots PR1 are PR2 are respectively found by executing an interpolation operation using the values of the existing plots adjacent to each other with the boundaries between the sections R1, R2 and R3 interposed therebetween, for example.

The origins of the curve patterns P1 and P7 corresponding to the middle gradation section R2 and the high gradation section R3 are respectively shifted to the plots PR1 and PR2. Consequently, the three curve patterns P2, P1 and P7 are coupled to each other, thereby to make it possible to reconstruct the detailed gradation correcting curve in the whole gradation section.

Since the whole gradation section is thus divided into a plurality of sections, matched curve patterns are found out with respect to the respective sections, and the curve patterns are coupled to each other to reconstruct the detailed gradation correcting curve in the whole gradation section, it is possible to produce a lot of types of gradation correcting curves using a small number of curve patterns. Consequently, too many curve patterns need not be stored in the ROM 72.

FIGS. 14 (a), 14 (b), 14 (c) and 14 (d) are diagrams for explaining a method of pattern matching. The gradation correcting curve is close to a quadratic curve in the low gradation section R1 and the high gradation section R3 and is close to a linear curve in the middle gradation section R2, for example, as shown in FIG. 14 (a). The following equations (2), (3) and (4) are applied to the low, middle and high gradation sections R1, R2 and R3 of the pre-gradation correcting curve:

Low gradation section:

$$Y = aX^2 + bX + c \quad (22)$$

Middle gradation section:

$$Y = dX + e \quad (3)$$

High gradation section:

$$Y = fX^2 + gX + h \quad \ldots (4)$$

The quadratic and linear curve patterns as shown in FIGS. 14 (a), 14 (c) and 14 (d) corresponding to the respective low, middle and high gradation sections R1, R2 and R3 are prepared in the ROM 72. The respective curve patterns also have different coefficients a, b, c, d, e, f, g and h.

In the pattern matching with respect to the low gradation section R1, the sum $\Delta A$ of the differences $\{\Delta a\}$, $\{\Delta b\}$ and $\{\Delta c\}$ in the coefficients a, b and c in respective terms between a quadratic curve to which the pre-gradation correcting curve is applied and a quadratic curve corresponding to the curve patterns stored in the ROM 72 is operated in accordance with the following equation (5):

$$\Delta A = \{\Delta a\} + \{\Delta b\} + \{\Delta c\} \quad (5)$$

The curve pattern in which the sum $\Delta A$ of the differences in the coefficients is minimum is employed.

In the pattern matching with respect to the middle gradation section R2, the slope of a straight line of the pre-gradation correcting curve R2 in the middle gradation section TR2 is calculated. The calculated slope and the slopes of the linear curve patterns in the ROM 72 are compared with each other, and the curve pattern whose slope is closest to the calculated slope is selected. Specifically, the curve pattern in which the difference $\{\Delta d\}$ in the coefficient d in the term of first degree is minimum is selected.

The pattern matching with respect to the high gradation section R3 is approximately the same as the pattern matching with respect to the low gradation section R1.

The whole of the calculated pre-gradation correcting curve is given by an expression of higher degree (for example, not less than the fourth degree). If the whole gradation section is divided as described above, however, a curve in each of the gradation sections R1, R2 and R3 can be given by a quadratic expression. Therefore, it is possible to match curves by simple computing expressions by dividing the gradation section.

FIG. 15 is a diagram for explaining still another technique for pattern matching. The coordinates of changed points CC1 and CC2 of a calculated pre-gradation correcting curve are first found out. The coordinates are compared with the coordinates of changed points of each of curve patterns in the ROM 72, and the curve pattern having a set of changed points whose coordinates are closest to those of the changed points CC1 and CC2 is selected as a detailed gradation correcting curve. In this case, it is preferable that a set of changed points of each of the curve patterns is previously stored as a characteristic parameter of the curve pattern. Such a method of pattern matching is also applicable to the above described technique described with reference to FIG. 13. Specifically, a detailed gradation correcting curve in the whole gradation section may be reconstructed by carrying out pattern matching based on the coordinates of the changed points in the respective sections R1, R2 and R3, finding out the best matched curve patterns in the gradation sections, and coupling the curve patterns to each other.

FIG. 16 is a diagram for explaining a further technique for pattern matching. First, straight line portions of a pre-gradation correcting curve are extracted, to find vectors V1, V2 and V3 representing the respective straight line portions. The extracted vectors V1, V2 and V3 are compared with vectors representing a plurality of straight line portions obtained by disassembling each of curve patterns in the ROM 72. Consequently, the curve pattern having a set of vectors which is most similar to the extracted vectors V1, V2 and V3 is employed as a detailed gradation correcting curve. In this case, it is preferable that as a characteristic parameter of each of the curve patterns, a set of vectors representing the curve pattern is previously stored. It will be apparent that such a method of pattern matching is also applicable to the above described technique described with reference to FIG. 13.

As pattern matching of the calculated pre-gradation correcting curve with the curve patterns in the ROM 72, a method of carrying out pattern matching on the basis of the number of changed points of the whole curve can be employed in addition to the above described methods.

Description is now made of a second embodiment of the present invention. In the description of the present embodiment, FIGS. 1, 2 and 5 will be referred to again. In the above described first embodiment, adjusting work is performed with respect to each of the colors M, C, Y and BK, and test pattern images must be respectively outputted and read with respect to the colors. On the other hand, in the present embodiment, test pattern images are outputted and read at one time with respect to all the colors, thereby to reduce processing time.

A color image sensor 12 provided for a scanner section 1 is so constructed as to read a red (R) filter, a green (G) filter and a blue (B) filter in units of dots by three pixels provided on the surface of the color image sensor 12. That is, R, G and B pixels are circularly aligned, for example, as shown in FIG. 17.

On the other hand, examples of toner particles used for image formation by a printer output section 66 include toner particles in four colors, that is, cyan which is the complementary color of red, magenta which is the complementary color of green, yellow which is the complementary color of blue, and black. Consequently, the gradation values of cyan, magenta and yellow single-color images are immediately found respectively on the basis of outputs of the respective R, G and B pixels. Further, the G filter has light transmission properties in an intermediate wavelength region of visible light. Therefore, it is considered that the gradation values of the black image can be satisfactorily read if the G pixel is used.

In the present invention, gradation correcting curves with respect to the colors M, C, Y and BK are prepared on the basis of the foregoing.

FIG. 18 shows one example of a test pattern image used in the present embodiment. The test pattern image is formed by the CPU 70 producing test data on the basis of reference data previously stored in the ROM 72 and applying the test data to the printer output section 66. The test pattern image has a magenta region RM where the gradation scale of magenta is formed, a cyan region RC where the gradation scale of cyan is formed, a yellow region RY where the gradation scale of yellow is formed, and a black region RBK where the gradation scale of black is formed. Each of the regions is formed in a stripe shape.

A position marker PM1 for representing the position of each of the regions on paper is further formed on the test pattern image. Specifically, the respective regions RM, RC, RY and RBK are formed in regions having a predetermined positional relationship with the position marker PM1.

Figure 19:
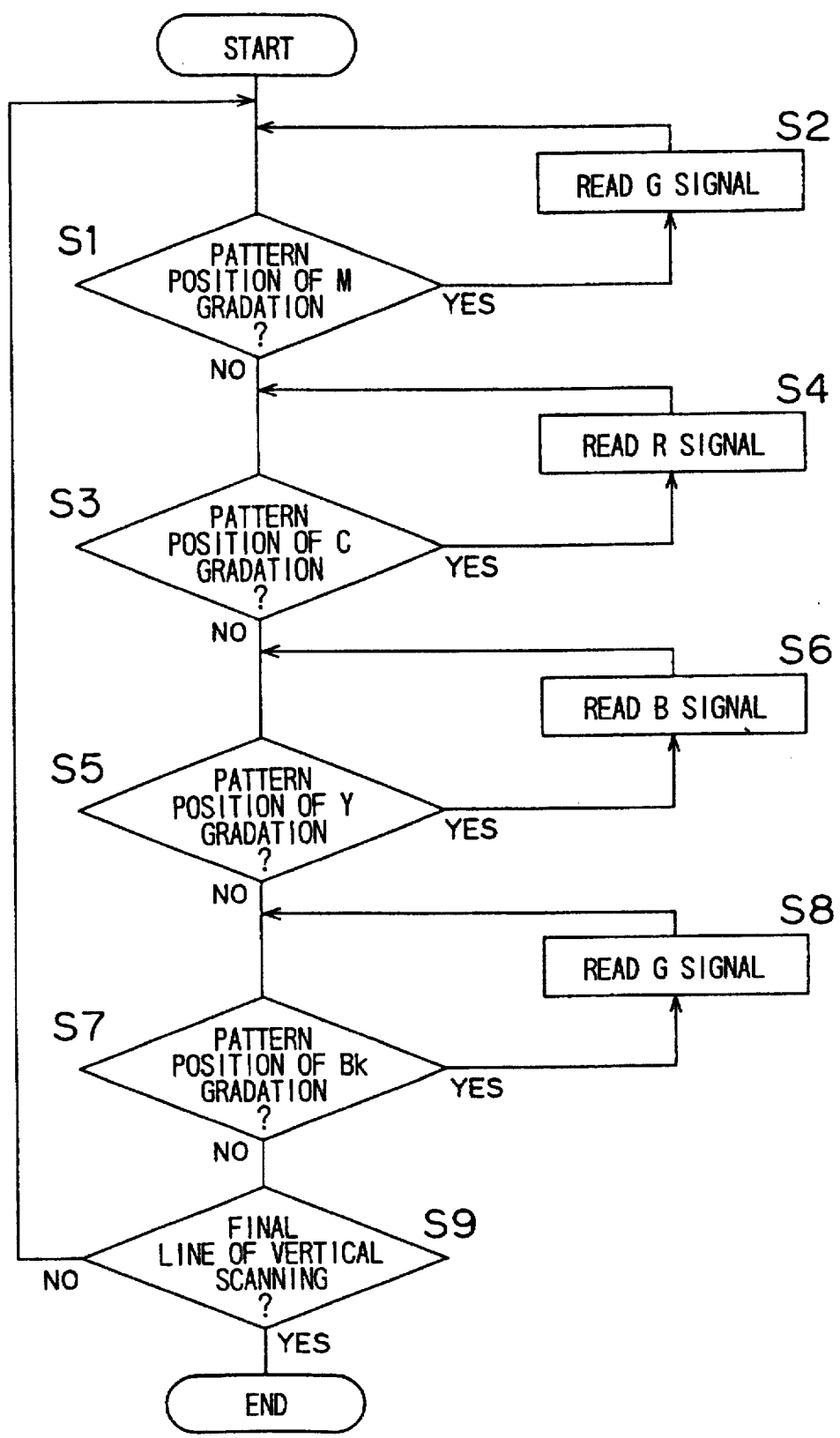
FIG. 19 is a flow chart for explaining processing in a case where the test pattern image is read.

FIG. 19 is a flow chart for explaining operations performed when a test pattern image is read so as to prepare a gradation correcting curve. Since the R, G and B pixels are circularly arranged in the image sensor 12 as described above, R, G and B signals are circularly outputted from the image sensor 12. When the magenta region RM is read, only data representing the G pixel corresponding to green which is the complementary color of magenta is accepted in the RAM 73 (see FIG. 2) (steps S1 and S2). Similarly, only data representing the R pixel corresponding to read which is the complementary color of cyan is accepted in the RAM 73 when the cyan region RC is read (steps S3 and S4), and only data representing the B pixel corresponding to blue which is the complementary color of yellow is accepted in the RAM 73 when the yellow region RY is read (steps S5 and S6). When the black region RBK is read, only the data representing the G pixel having intermediate wavelength properties is accepted in the RAM 73 (steps S7 and S8). If reading of all the regions is completed, the processing is terminated, whereby processing in the step b6 and the subsequent steps in FIG. 5 is performed using respective data separately extracted with respect to the regions RM, RC, RY and RBK (step S9). The positions of the respective regions RM, RC, RY and RBK are recognized on the basis of the position marker PM1.

As described in the foregoing, according to the present embodiment, a gradation correcting curve corresponding to all the toner particles can be prepared by outputting and reading one test pattern image. Therefore, it is possible to prepare the gradation correcting curve by significantly simple work.

Although the present embodiments of the invention were described, the present invention is not limited to the above described embodiments. Therefore, various types of design changes can be made in the range in which the gist of the present invention is not changed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   image reading means for reading an image to output data each represented by gradation values;
   image forming means for forming an image on the basis of the image data;
   curve pattern storing means for storing a plurality of types of curve patterns that are different from each other;
   means for providing test data to said image forming means in order to form a test image with said image forming means;
   means for comparing an output of said image reading means in a case where the test image is read by the image reading means with a predetermined reference value, and calculating a pre-gradation correcting curve on the basis of the comparison;
   means for matching said calculated pre-gradation correcting curve with a plurality of types of curve patterns in said curve pattern storing means and preparing a gradation correcting curve on the basis of the at least one matched curve pattern; and
   gradation correcting means for correcting gradation values of image data outputted from said image reading means in accordance with said prepared gradation correcting curve and providing image data after the correction to said image forming means to adjust the density for image formation.

2. The image forming apparatus according to claim 1, further comprising
   means for variably setting the slope of each of the curve patterns stored in said curve pattern storing means on the basis of the results of the comparison between the output of said image reading means in a case where the image formed on the basis of said test data is read by the image reading means and said predetermined reference value,
   said setting means matching the calculated pre-gradation correcting curve with the curve pattern whose slope has been variably set to form the gradation correcting curve.

3. The image forming apparatus according to claim 2, wherein
   the image forming apparatus can form a color image formed by mixing a plurality of basic colors,
   said storing means stores curve patterns respectively corresponding to the plurality of basic colors, and
   said pre-gradation correcting means and said setting means derive the pre-gradation correcting curve and the gradation correcting curve for each basic color.

4. The image forming apparatus according to claim 1 wherein
   the image forming apparatus can form a color image formed by mixing a plurality of basic colors,
   said storing means stores curve patterns respectively corresponding to the plurality of basic colors, and
   said pre-gradation correcting means and said setting means derive the pre-gradation correcting curve and the gradation correcting curve for each basic color.

5. The image forming apparatus according to claim 1, wherein
   the plurality of types of curve patterns are divided into three groups representing a lower curve portion, a straight portion, and an upper curve portion,
   said matching means prepares the gradation correcting curve by joining a first curve pattern that best matches the lower curve portion to a second curve pattern that best matches the straight portion to a third curve portion that best matches the upper curve portion.

6. A gradation output adjusting method in an image forming apparatus comprising image reading means for reading an image to output data each represented by gradation values corresponding to each portion of the image, image forming means for forming an image on the basis of the data each represented by gradation values, and gradation correcting means for correcting a gradation value of input data in accordance with a gradation correcting curve which can be variably set and inputting the data after the correction to said image forming means to adjust the density for image formation, comprising the steps of:

storing a plurality of types of curve patterns of the gradation correcting curve in curve pattern storing means to be referred to by the gradation correcting means;

inputting predetermined test data corresponding to an image including a plurality of regions which differ in gradation values into the image forming means to form an image corresponding to the test data;

comparing an output of said image reading means in a case where the image formed on the basis of the test data is read by the image reading means with a predetermined reference value corresponding to said test data;

finding a proper gradation value of data to be inputted to the image forming means with respect to a plurality of predetermined gradation values of the input data;

calculating a pre-gradation correcting curve representing the relationship between the input data and the data to be inputted into the image forming means on the basis of the proper gradation value;

matching said calculated pre-gradation correcting curve with the curve patterns in the curve pattern storing means; and setting at least one of the curve patterns as the best matched curve pattern for the gradation correcting curve to be referred to by the gradation correcting means.

7. The gradation output adjusting method according to claim 6, further comprising the step of variably setting the slope of each of the curve patterns stored in said curve pattern storing means on the basis of the results of the comparison between the output of the image reading means in a case where the image formed on the basis of the test data is read by the image reading means and said predetermined reference value.

8. The gradation output adjusting method according to claim 7, wherein the method is applied to a color image forming apparatus for forming a color image by mixing a plurality of basic colors, the steps being carried out with respect to each of said plurality of basic colors.

9. The gradation output adjusting method according to claim 6, wherein the method is applied to a color image forming apparatus for forming a color image by mixing a plurality of basic colors, the steps being carried out with respect to each of said plurality of basic colors.

10. The gradation output adjusting method according to claim 6, wherein the step of matching includes dividing said calculated pre-gradation correcting curve into three portions representing a lower curve portion, a straight portion, and an upper curve portion to match each portion to the best matched curve pattern, and the step of setting includes setting the best matched curve patterns as one continuous gradation correcting curve by connecting the best matched lower curve portion to the best matched straight portion to the best matched upper curve portion.

* * * * *